US009027904B2

(12) United States Patent
Najmolhoda et al.

(10) Patent No.: US 9,027,904 B2
(45) Date of Patent: May 12, 2015

(54) DIRECT ACTING SOLENOID ACTUATOR

(71) Applicant: Flextronics AP, LLC, Broomfield, CO (US)

(72) Inventors: Hamid Najmolhoda, Grand Rapids, MI (US); Matthew S. Peterson, Broomfield, CO (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 13/939,887

(22) Filed: Jul. 11, 2013

(65) Prior Publication Data
US 2014/0014863 A1 Jan. 16, 2014

Related U.S. Application Data

(60) Provisional application No. 61/741,054, filed on Jul. 11, 2012.

(51) Int. Cl.
*F16K 31/02* (2006.01)
*F16K 31/06* (2006.01)
*H01F 7/16* (2006.01)

(52) U.S. Cl.
CPC .............. *F16K 31/06* (2013.01); *F16K 31/0613* (2013.01); *F16C 2322/39* (2013.01); *H01F 2007/163* (2013.01)

(58) Field of Classification Search
USPC .............. 251/129.15, 30.01, 129.08; 335/262; 137/596.17; 384/48, 51, 623
See application file for complete search history.

(56) References Cited

U.S. PATENT DOCUMENTS

| 2,923,582 | A | * | 2/1960 | Dunn | 384/623 |
|---|---|---|---|---|---|
| 3,851,285 | A | * | 11/1974 | Rothfuss et al. | 335/262 |
| 3,856,047 | A | | 12/1974 | Takayama | |
| 4,131,866 | A | * | 12/1978 | Torr | 335/262 |
| 4,267,897 | A | * | 5/1981 | Takeshima | 180/423 |
| 4,525,695 | A | * | 6/1985 | Sheng et al. | 335/262 |
| 4,579,145 | A | | 4/1986 | Leiber et al. | |
| 4,662,605 | A | | 5/1987 | Garcia | |
| 4,774,976 | A | | 10/1988 | Janecke et al. | |
| 4,905,961 | A | | 3/1990 | Ichihashi et al. | |
| 4,966,195 | A | | 10/1990 | McCabe | |
| 4,998,559 | A | | 3/1991 | McAuliffe, Jr. | |
| 5,051,631 | A | | 9/1991 | Anderson | |
| 5,217,047 | A | | 6/1993 | McCabe | |
| 5,249,603 | A | * | 10/1993 | Byers, Jr. | 137/625.65 |
| 5,626,327 | A | * | 5/1997 | Clark | 251/129.15 |
| 5,853,028 | A | | 12/1998 | Ness et al. | |
| 6,029,704 | A | * | 2/2000 | Kuroda et al. | 137/625.65 |
| 6,313,726 | B1 | * | 11/2001 | Golovatai-Schmidt et al. | 335/220 |
| 6,397,891 | B1 | | 6/2002 | Neuhaus et al. | |
| 6,435,213 | B2 | | 8/2002 | Lou | |
| 7,007,925 | B2 | * | 3/2006 | Nordstrom et al. | 251/129.15 |
| 7,766,042 | B2 | | 8/2010 | Tabor | |

(Continued)

FOREIGN PATENT DOCUMENTS

JP 07-151257 A 6/1995

*Primary Examiner* — Matthew W Jellett
(74) *Attorney, Agent, or Firm* — Volpe and Koenig, P.C.

(57) ABSTRACT

A direct acting solenoid actuator includes an armature and associated push pin that are suspended from certain fixed solenoid components, such as a pole piece and/or flux sleeve, by a fully floating cage of rolling elements. The fixed solenoid component may comprise a pole piece and/or a flux sleeve. The pole piece may include stops to limit movement of the cage of rolling elements in the axial direction.

18 Claims, 6 Drawing Sheets

SECTION A-A

(56) References Cited

U.S. PATENT DOCUMENTS

| | | |
|---|---|---|
| 8,006,719 B2 * | 8/2011 | Nordstrom et al. ...... 137/625.68 |
| 8,371,331 B2 | 2/2013 | Najmolhoda et al. |
| 2006/0011878 A1 | 1/2006 | Denyer et al. |
| 2007/0138422 A1 | 6/2007 | Najmolhoda et al. |
| 2009/0256091 A1 * | 10/2009 | Nordstrom et al. ...... 251/129.15 |
| 2013/0104842 A1 * | 5/2013 | Weldon et al. ........... 123/339.27 |
| 2013/0167950 A1 * | 7/2013 | Nomichi et al. ........... 137/487.5 |

* cited by examiner

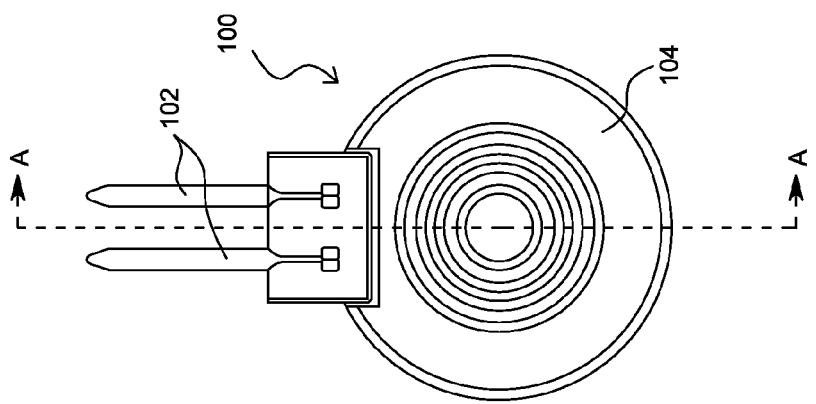
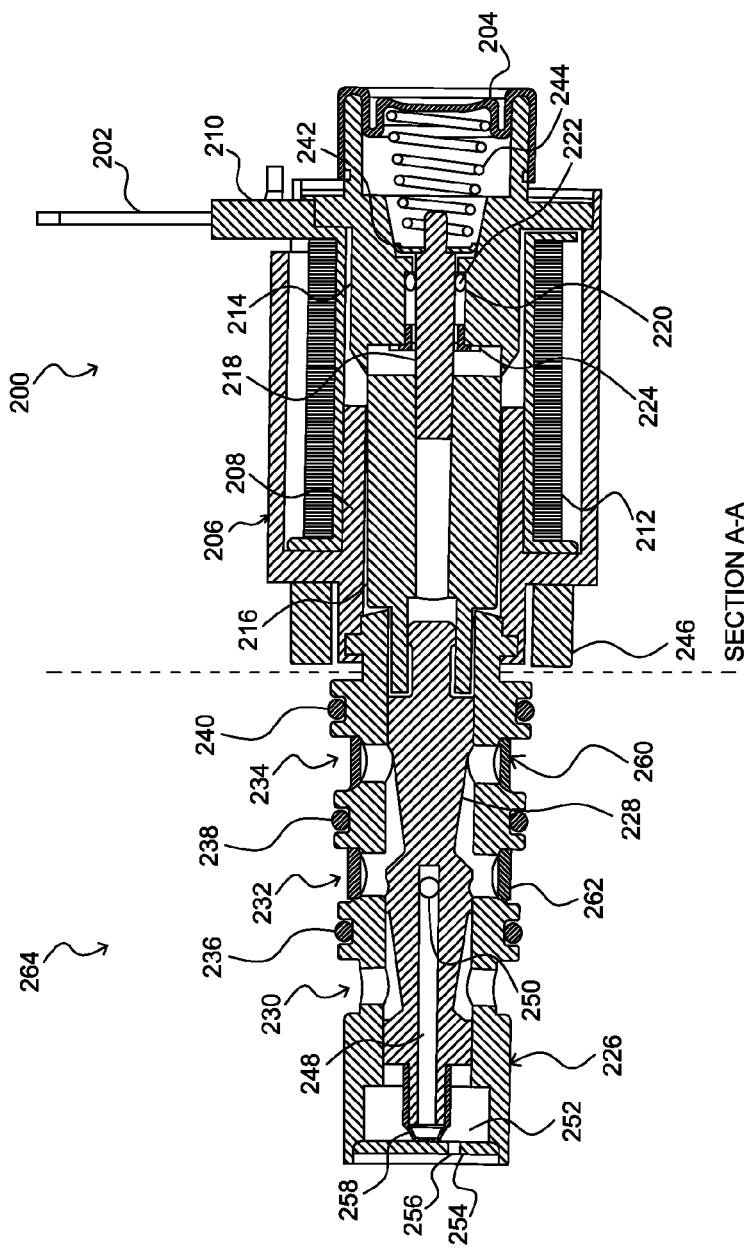
FIG. 1
FIG. 2

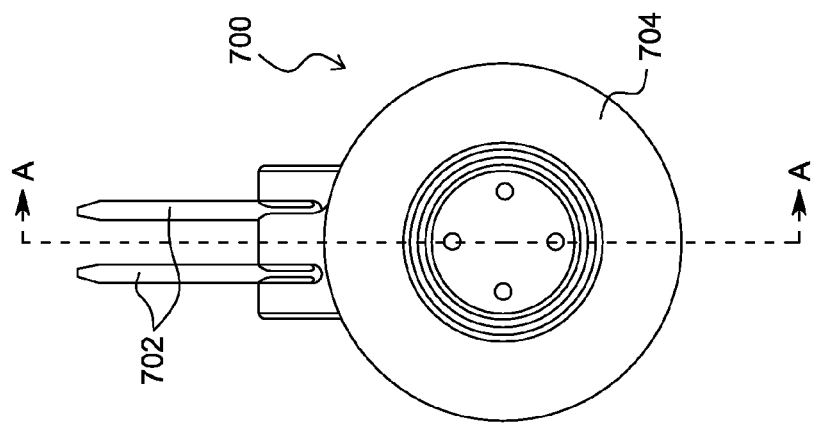
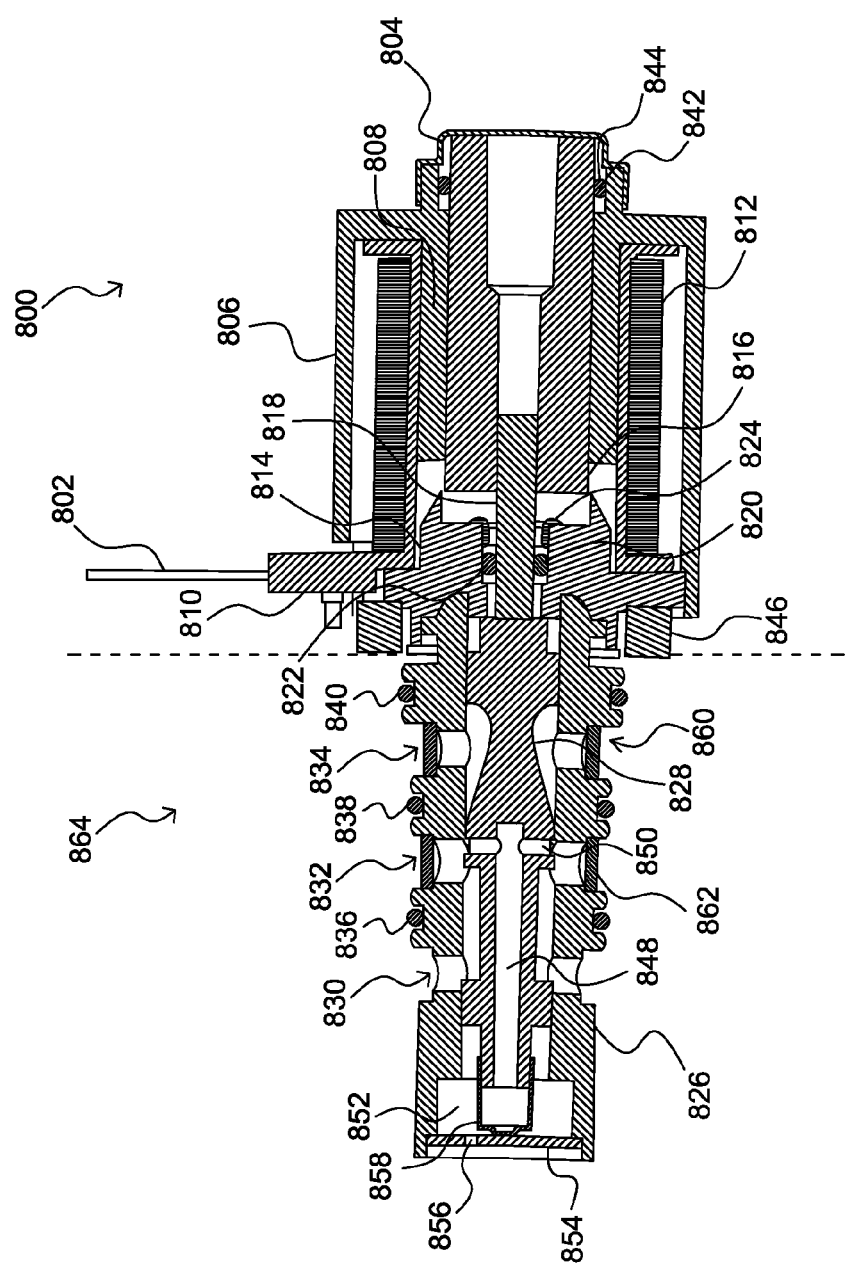

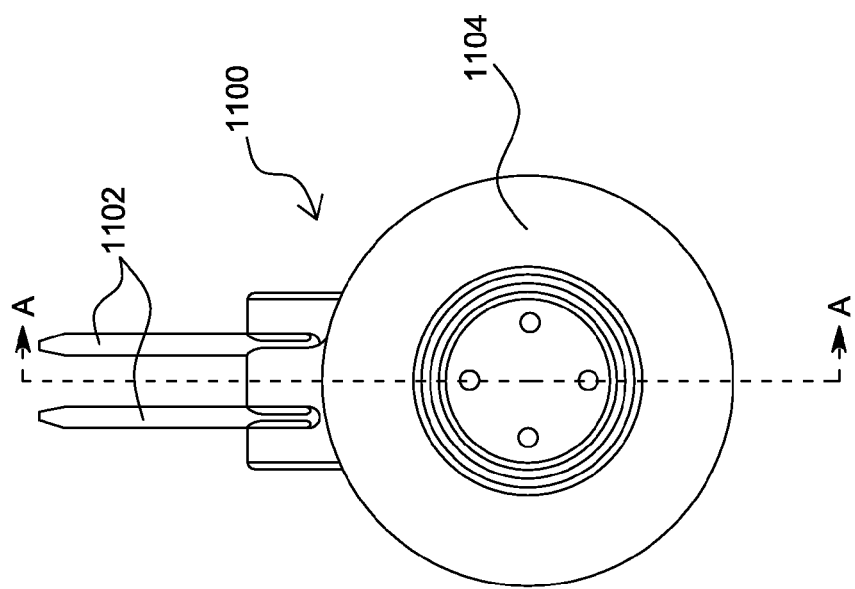
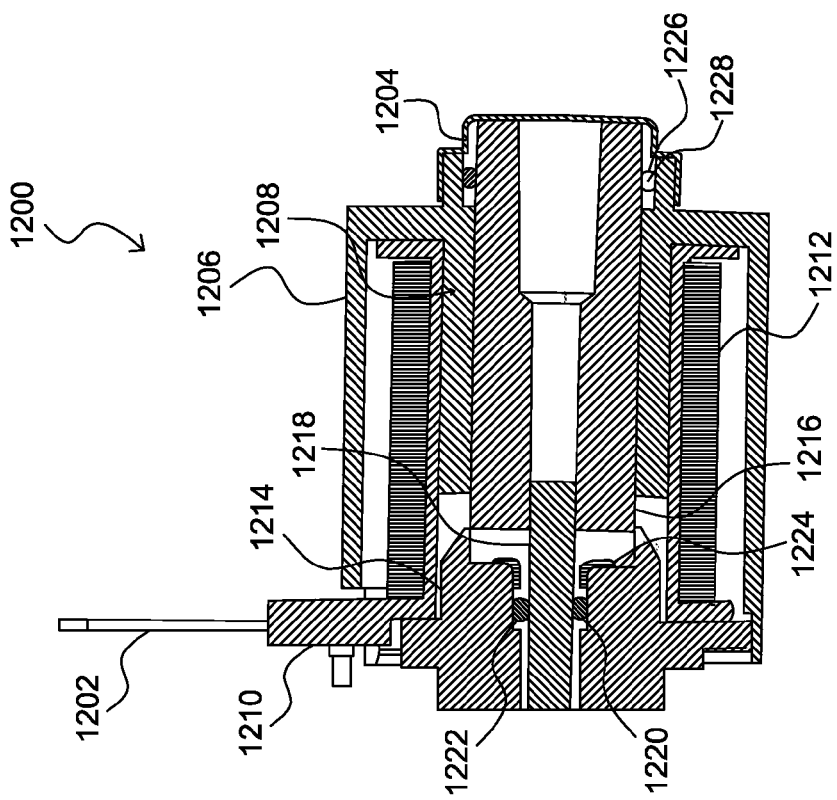

DIRECT ACTING SOLENOID ACTUATOR

CROSS REFERENCE TO RELATED APPLICATION(S)

This application claims the benefit of U.S. Patent Application No. 61/741,054 filed on Jul. 11, 2012, which is incorporated by reference as if fully set forth.

FIELD OF THE INVENTION

The present invention relates to a direct acting electromagnetic solenoid actuator having an armature mechanism that drives a fluid control element.

BACKGROUND OF THE INVENTION

Direct acting solenoid actuators are often used to control fluid pressure in a variety of systems, including clutch mechanisms and other devices in an automobile. Direct acting solenoid actuators employ an armature mechanism that drives a fluid control element, such as a spool, a spring-biased four-way proportional flow control valve, a poppet valve and the like in various hydraulic control applications. Typically, the armature is connected to, and drives, a push pin that engages the fluid control element to this end.

A change in the electrical current supplied to the solenoid results in a change in fluid pressure. Ideally, a given input current corresponds to a single pressure, independent of whether the input current is increasing or decreasing. For example, consider a solenoid that is initially at high pressure (20 bars) at zero current. When a 0.5 Amp current is applied, the pressure drops to 12 bars. Ideally, if the current is increased to 1 Amp, and then decreased back down to 0.5 Amps, the pressure will again be 12 bars. Thus, a pressure value can be determined for each value of the current, independent of whether the current is increasing or decreasing.

In reality, a number of factors contribute to hysteresis in solenoid actuators. Hysteresis describes the difference in output for a given input when the input is increasing versus decreasing. In a direct acting solenoid actuator, friction between the armature and the armature sleeve, as well as debris in the hydraulic fluid surrounding the armature, may prevent the armature from sliding smoothly in response to the induced magnetic field. This may result in different values of pressure for a given current, depending on whether the current is increasing or decreasing. As such, the reliability of the actuator decreases, and the direction of the current (increasing or decreasing) must be taken into account when selecting a current for achieving a desired pressure.

Thus, there is a need for direct acting solenoid actuators that reduce or minimize hysteresis during operation while improving robustness to contamination in the form of foreign matter in the hydraulic fluid.

SUMMARY OF THE INVENTION

A direct acting solenoid actuator includes an armature and associated push pin member that are suspended from certain fixed solenoid components by a fully floating and independent cage of rolling elements, such as ball or radial bearings. The fixed solenoid component may comprise a pole piece and/or a flux sleeve. The pole piece may include stops to limit movement of the cage of rolling elements in the axial direction.

BRIEF DESCRIPTION OF THE DRAWINGS

FIG. 1 is an elevation view of a fluid control valve having a direct acting solenoid actuator for driving a spool having a floating feedback piston in linear fashion pursuant to an illustrative embodiment of the invention.

FIG. 2 is a longitudinal cross-sectional view taken along line A-A of FIG. 1.

FIG. 7 is an elevation view of a fluid control valve having a direct acting solenoid actuator for driving a spool having a floating feedback piston in linear fashion pursuant to another embodiment of the invention.

FIG. 8 is a longitudinal cross-sectional view taken along line A-A of FIG. 7.

FIG. 11 is an elevation view of a direct acting solenoid actuator for driving a spool (not shown), a threeway poppet valve (not shown), or other fluid control valve in relation to a commanded variable control pressure.

FIG. 12 is a longitudinal cross-section view taken along line A-A of FIG. 11.

DETAILED DESCRIPTION OF THE INVENTION

Figure 3:
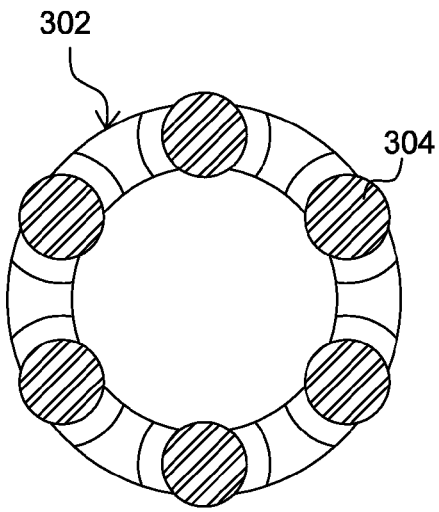
FIG. 3 shows a sectional view of the cage of rolling elements pursuant to an illustrative embodiment.

Referring to FIG. 1, a direct acting solenoid actuator 100 is shown having electrical terminals 102 and a calibration cap 104. A longitudinal cross-sectional view taken along line A-A of FIG. 1 is shown in FIG. 2.

A fluid control valve 264 has a direct acting solenoid actuator 200 pursuant to an illustrative embodiment of the invention. The direct acting solenoid actuator 200 drives a spool 228 within a nozzle body 226 of the fluid control valve 264. In one embodiment of the invention, the spool 228 includes a spool cap (floating feedback piston) 258. The direct acting solenoid actuator 200 comprises a housing 206 containing a bobbin 210, a coil 212 of wire wound on the bobbin 210 and connected to electrical terminals 202. In one embodiment, the housing 206 comprises steel and the bobbin 210 is a synthetic material such as plastic, although those in the art would realize that other materials may be used. The coil 212 is contained between the outer part of the housing 206 and a flux sleeve 208. A pole piece 214 is fixedly mounted on the end of the housing 206 with an armature stop 224 fixedly disposed in the inner bore of the pole piece 214. A spacer 246 is provided on the end wall of the housing 206 to position the fluid control valve 264.

As will be described hereinafter, a fully floating cage 220 of radial bearings 222 is disposed in the inner bore of the pole piece 214, with the radial bearings 222 riding on the inner surface of the pole piece 214 and also riding on the outer surface of the push pin 218 (armature push member) associated with the armature 216. The cage 220 is fully floating in the annular space between the pole piece 214 and the push pin 218 in that the cage 220 is not fixed in any plane and can move freely axially and radially in the annular space between the illustrated integral shoulder on the inner bore of the pole piece 214 and the armature stop 224. This permits the movement of the armature 216 to be axially aligned relative to the pole piece 214 and the flux sleeve 208. The push pin 218 is press fit or otherwise connected to the armature 216, which is received in the flux sleeve 208 of the housing 206 such that the armature 216 and push pin 218 together move axially in response to current applied to the coil 212.

Referring to FIG. 3, a cage 302 of radial bearings 304 is shown. The cage 302 may have a variety of shapes, not limited to that shown. The ratio of the diameter of the cage 302 with respect to the diameter of the radial bearings 304 may also be varied. The diameter of the cage 302 may be determined based on a particular direct acting solenoid actuator. For example, the cage 302 may be sized such that the radial bearings 304 ride on the inner surface of the pole piece 214 in FIG. 2 and also ride on the outer surface of the push pin 218. The cage 302 may be "thin" with respect to the diameter of the radial bearings 304, thereby exposing a greater portion of the radial bearings 304, or may surround the radial bearings 304 almost completely. In either case, a portion of the radial bearings 304 may be exposed, and may extend beyond the inner and outer diameter of the cage 302. The cage 302 may house six radial bearings 304, as shown FIG. 3, or may have greater or fewer radial bearings 304.

Figure 4:
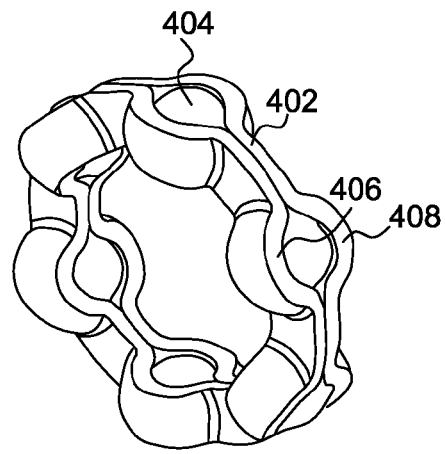
FIG. 4 shows a perspective view of the cage of rolling elements of FIG. 3.

FIG. 4 shows a perspective view of the cage 302 of radial bearings 304 shown in FIG. 3. Referring to FIG. 4, the cage 402 may comprise a top piece 406 and a bottom piece 408. The top piece 406 and bottom piece 408 may be solid, covering the top and bottom of each radial bearing 404, or may be open, such that a portion of the top and bottom of the radial bearings 404, as well as the sides, are exposed. Alternatively, the cage 402 may comprise a single piece. The radial bearings 404 may be free to rotate in all directions within the cage 402. Of course, those of skill in the art would realize that the function of the top and bottom pieces 406, 408 is to hold the radial bearings 404 in position relative to each other, although some amount of flexibility in the top and bottom pieces 406, 408 may be permitted.

Figure 5:
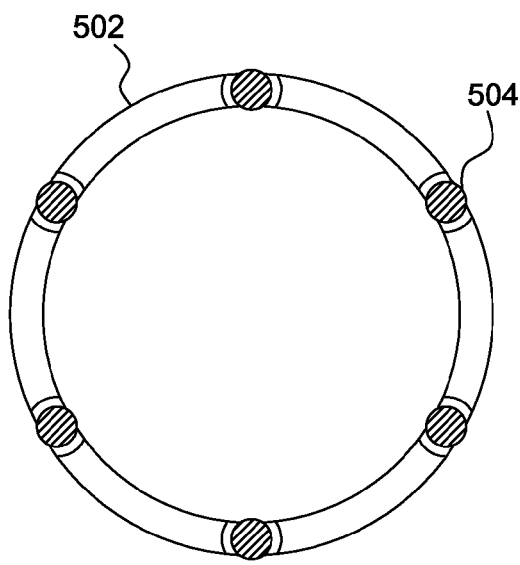
FIG. 5 shows a sectional view of the cage of rolling elements having different radial bearing diameters pursuant to another illustrative embodiment.
Figure 6:
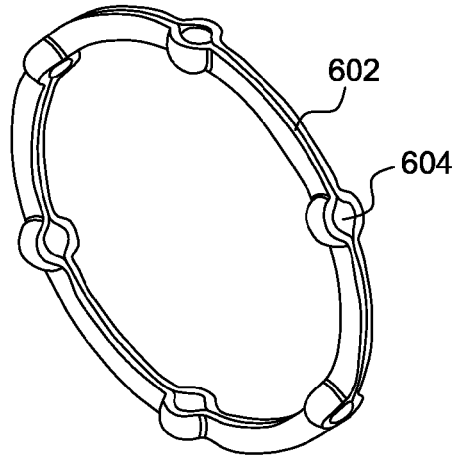
FIG. 6 shows a perspective view of the cage of FIG. 5 for the radial bearings.

FIG. 5 shows another embodiment of a cage 502 of radial bearings 504. The cage 502 in this embodiment has a larger diameter with respect to the diameter of the radial bearings 504. FIG. 6 shows a side view of the cage 602 of radial bearings 604.

In a conventional solenoid actuator, the armature push member is received with a tight fit into the pole piece. Referring back to FIG. 2, this would correspond to the push pin 218 being in full contact with the pole piece 214, or in sliding contact with a bushing (not shown) which is received with a tight fit into the pole piece 214. Changes in current applied to the coil 212 result in movement of the armature 216 and push pin 218, causing the outer surface of the push pin 218 to slide against the inner surface of the pole piece 214 or bushing. If fluid carrying contaminants were to enter the area between the push pin 218 and the pole piece 214 or bushing, the contaminants may become lodged between the push pin 218 and the pole piece 214 or bushing, greatly increasing the friction between them, and altering the response of the fluid control valve 264 to a given applied current. This altered response contributes to hysteresis, reducing the reliability and/or repeatability of the fluid control valve 264 response to a particular current. Depending on the size and quantity of the contaminants, the performance of the fluid control valve 264 may degrade to the point of failure. If the area between the push pin 218 and the pole piece 214 were increased, the armature 216 and push pin 218 may become misaligned with the flux sleeve 208 and pole piece 214, increasing the friction between the surfaces, and degrading the fluid control valve response.

In contrast, referring back to FIG. 2, the present invention comprises a cage 220 of radial bearings 222 that is positioned between the push pin 218 and the pole piece 214. The cage 220 of radial bearings 222 allows for a space between the pole piece 214 and the push pin 218. In the event that fluid carrying contaminants enters the space between the pole piece 214 and the push pin 218, the likelihood that contaminants will become lodged between the push pin 218 and the pole piece 214 is greatly reduced due to the larger space. The solenoid is thus less susceptible to damage caused by contaminants in the fluid. The cage 220 of radial bearings 222 also serves to guide the axial motion of the push pin 218, meanwhile reducing friction between the pole piece 214 and the push pin 218. Instead of the pole piece 214 being in full contact with the push pin 218, the pole piece 214 and push pin 218 are each now only in contact with the radial bearings 222. These radial bearings 222 are free to move within the cage 220, and thus allow the push pin 218 to move within the pole piece 214 with minimal resistance. It should be noted that although only one cage 220 is shown the particular location, several cages 220 may be utilized, and in different locations.

The reduced diameter end of the armature 216 is received with tight supporting fit on the adjacent end of the spool 228. The nozzle body 226 includes supply port 234 defined between O-ring seals 238 and 240 and protected by filter 260; control port 232 defined between O-ring seals 236 and 238 and protected by filter 262; exhaust port 230; and end exhaust opening 256 in the nozzle cap 254. The spool 228 is moved in response to movement of the armature 216 to regulate pressure at the control port 232.

The outer end of the push pin 218, and thus the armature 216, is biased by a spring mechanism 244. FIG. 2 shows a conical coil spring, though other types of spring mechanisms may be used. The spring mechanism 244 is confined between a spring cap 242 and a calibration cap 204 that may be deformed to adjust spring preload that establishes the high pressure state of the control valve (shown in FIG. 2 at 0 Amps; no current to coil 212). Thus, at 0 Amps, the supply port 234 is open to the control port 232, defining the high pressure state. As the current applied to the coil 212 increases, the armature 216 and thus the spool 228 are displaced toward the spring mechanism 244, resulting in a narrowing of the hydraulic pathway between the supply port 234 and the control port 232. This causes the control pressure and thereby the hydraulic force to drop accordingly.

In one embodiment of the invention, the spool 228 includes a spool cap (floating feedback piston) 258 that communicates to a longitudinal spool bore 248 and radial spool bore 250 that is open to the control port 232 as shown in FIG. 2. The exterior of the spool cap 258 is exposed to exhaust or zero pressure in chamber 252, while the interior of the spool cap 258 is exposed to control pressure as just described so that the spool cap 258 is axially and independently movable relative to the spool 228 and so that the pressure contained in the spool cap 258 acts on the spool 228 with a force that is directly proportional to the control pressure and the fluid-contacting area inside the spool cap 258. The spool cap 258 in effect acts as a vessel to retain this pressure. This hydraulic force balances out the magnetic force on the armature 216.

The spool cap 258 will be forced or moved axially against or abutting the nozzle cap 254 due to the hydraulic control pressure therein and will remain stationary, while the spool 228 moves to regulate control pressure as commanded. The spool cap 258 eliminates the need for the spool 228 and nozzle body 226 to have stepped diameters between each other to achieve equivalent differential feedback area as the spool cap 258 provides.

Referring to FIG. 7, a direct acting solenoid actuator 700 is shown having electrical terminals 702 and an armature end cap 704. A longitudinal cross-sectional view taken along line A-A of FIG. 7 is shown in FIG. 8. A fluid control valve 864 has a direct acting solenoid actuator 800 pursuant to another illustrative embodiment of the invention. The direct acting solenoid actuator 800 drives a spool 828 within a nozzle body 826 of the fluid control valve 864. In one embodiment of the invention, the spool 828 includes a spool cap (floating feedback piston) 858. The direct acting solenoid actuator 800 comprises a housing 806 containing a bobbin 810, a coil 812 of wire wound on the bobbin 810 and connected to electrical terminals 802. The coil 812 is contained between the outer part of the housing 806 and a flux sleeve 808. A pole piece 814 is fixedly mounted on the end of the housing 806 with an armature stop 824 fixedly disposed in the inner bore of the pole piece 814. A spacer 846 is provided on the end wall of the housing 806 to position the fluid control valve 864.

A first fully floating cage 820 of radial bearings 822 is disposed in the inner bore of the pole piece 814, with the radial bearings 822 riding on the inner surface of the pole piece 814 and also riding on an outer surface of the push pin 818 associated with the armature 816. The cage 820 is fully floating in the annular space between the pole piece 814 and the push pin 818 in that the cage 820 is not fixed in any plane and can move freely axially and radially in the annular space between the illustrated integral shoulder on the inner bore of the pole piece 814 and the armature stop 824. The push pin 818 is press fit or otherwise connected to armature 816, which is received in the flux sleeve 808 of the housing 806, such that the armature 816 and push pin 818 move axially in response to current applied to the coil 812.

The outer end surface of the armature 816 is also received in a second fully floating cage 844 of radial bearings 842 residing in armature end cap 804, which is fixed to the housing 806 with the radial bearings 842 riding on the outer surface of the armature 816. The second cage 844 is fully floating as described above in the annular space between the end of the housing 806 and the armature end cap 804.

The normally low and normally high pressure states of the control valve shown in FIG. 8 are established by externally commanded control current signals provided to the coil 812. An optional spring (not shown) may be disposed between the nozzle cap 854 and the spool cap 858 if a calibration feature is desired.

The inner end of the push pin 818 engages the adjacent end of the spool 828. The nozzle body 826 includes a supply port 834 between O-ring seals 838 and 840 and protected by filter 860; control port 832 between O-ring seals 836 and 838 and protected by filter 862; exhaust port 830; and exhaust opening 856 in nozzle cap 854. The spool 828 is moved in response to movement of the armature 816 to regulate pressure at the control port 832.

In one embodiment of the invention, the spool 828 includes a spool cap (floating feedback piston) 858 that communicates to a longitudinal spool bore 848 and radial spool bores 850 to the control port 832 as shown in FIG. 8. The exterior of the spool cap 858 is exposed to exhaust or zero pressure in chamber 852, while the interior of the spool cap 858 is communicated to control pressure as described via bores 848, 850 so that the pressure contained in the spool cap 858 acts on the spool 828 with a force that is directly proportional to the pressure and area inside the spool cap 858. This hydraulic force balances out the magnetic force on the armature 816. The spool cap 858 will be forced or moved axially against and abutting the nozzle cap 854 due to the hydraulic control pressure therein and will remain stationary, while the spool 828 moves to regulate control pressure as commanded.

Figure 9:
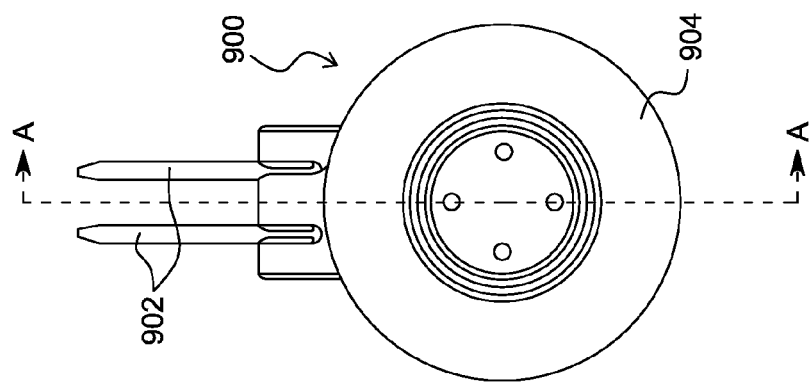
FIG. 9 is an elevation view of a fluid control valve having a direct acting solenoid actuator for driving a spring biased fourway proportional flow control spool valve in linear fashion pursuant to another embodiment of the invention.
Figure 10:
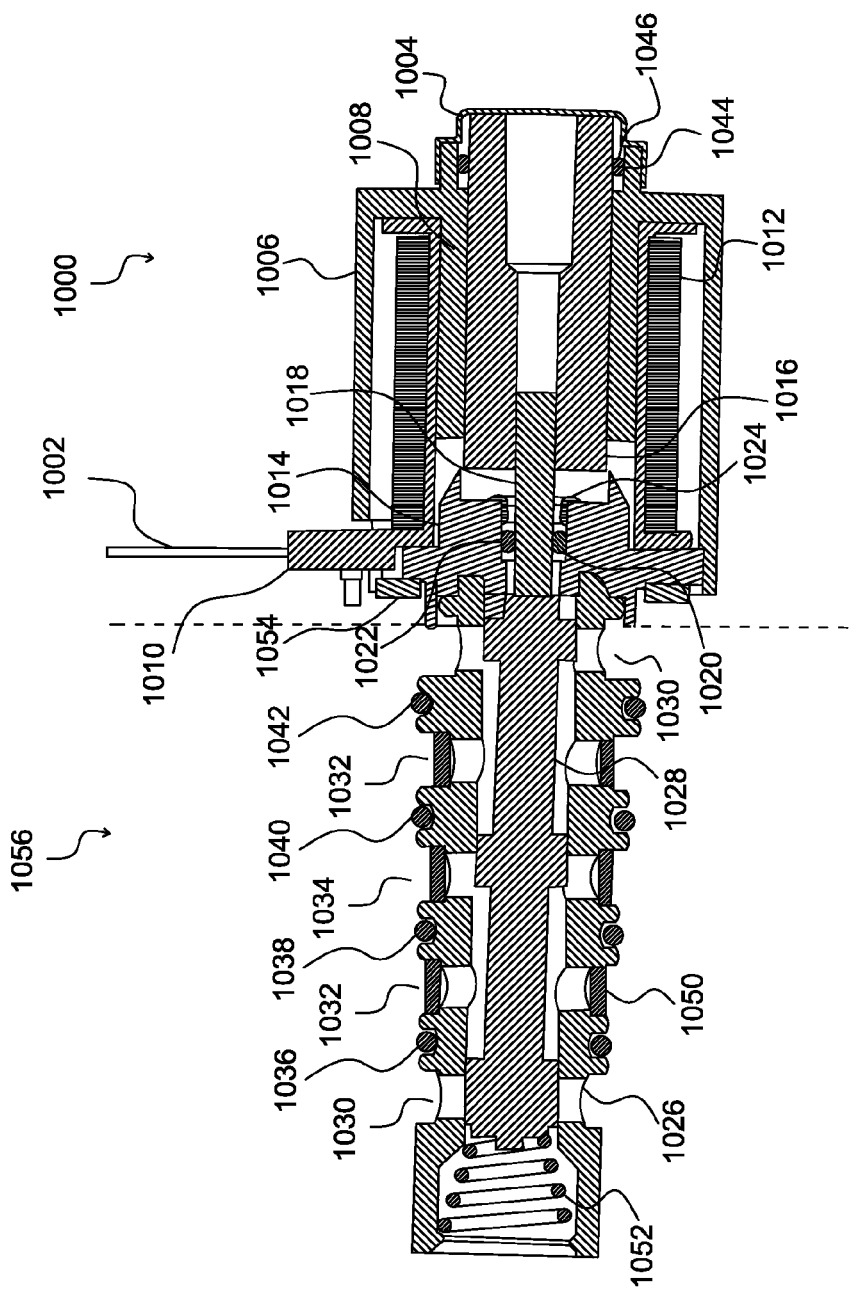
FIG. 10 is a longitudinal cross-sectional view taken along line A-A of FIG. 9.

Referring to FIG. 9, a direct acting solenoid actuator 900 is shown having electrical terminals 902 and an armature end cap 904. A longitudinal cross-sectional view taken along line A-A of FIG. 9 is shown in FIG. 10. A fluid control valve 1056 is shown having a direct acting solenoid actuator 1000 pursuant to an embodiment of the invention. The direct acting solenoid actuator 100 drives a spring biased four-way proportional flow control spool 1028 in linear fashion.

The direct acting solenoid actuator 1000 comprises a housing 1006 containing a bobbin 1010, and a coil 1012 of wire wound on the bobbin 1010 and connected to electrical terminals 1002. The coil 1012 is contained between the outer part of the housing 1006 and a flux sleeve 1008. A pole piece 1014 is fixedly mounted on the end of the housing 1006 with an armature stop 1024 fixedly disposed in the inner bore of the pole piece 1014. A spacer 1054 is provided on the end wall of the housing 1006 to position the fluid control valve 1056.

A first fully floating cage 1020 of radial bearings 1022 is disposed in the inner bore of the pole piece 1014, with the radial bearings 1022 riding on the inner surface of the pole piece 1014 and also riding on an outer surface of the push pin 1018 associated with the armature 1016. The cage 1020 is fully floating in the annular space between the pole piece 1014 and the push pin 1018 in that the cage 1020 is not fixed in any plane and can move freely axially and radially in the annular space between the illustrated integral shoulder on the inner bore of the pole piece 1014 and the armature stop 1024. The push pin 1018 is press fit or otherwise connected to armature 1016, which is received in the flux sleeve 1008 of the housing 1006, such that the armature 1016 and push pin 1018 move axially in response to the current applied to the coil 1012.

The outer end surface of the armature 1016 is also received in a second fully floating cage 1046 of radial bearings 1044 residing in the armature end cap 1004, which is fixed to the housing 1006 with the radial bearings 1022 riding on the outer end surface of the armature 1016. The second cage 1046 is fully floating as described above in the annular space between the end of the housing 1006 and the armature end cap 1004. The push pin 1018 is press fit or otherwise connected to the armature 1016.

The outer end of the spool 1028 is biased by a spring mechanism 1052. FIG. 10 shows a conical coil spring, though other types of spring mechanisms may be used. The spring mechanism 1052 is confined in an outermost end chamber of the nozzle body 1026. The inner end of the push pin 1018 engages the adjacent end of the spool 1028. The nozzle body 1026 includes first and second control ports 1032 defined between O-ring seals 1036 and 1038 and between O-ring seals 1040 and 1042 protected by filters 1050 and exhaust ports 1030 outboard of O-ring seals 1036 and 1042, and a central supply port 1034 between O-ring seals 1038 and 1040 and protected by a filter 1050 as well. The spool 1028 is moved in response to armature 1016 movement to regulate pressure at the control ports 1032. The spool 1028 is pressure balanced hydraulically so that the solenoid force is opposed by the spring mechanism 1052.

Referring to FIG. 11, a direct acting solenoid actuator 1100 is shown having electrical terminals 1102 and a calibration cap 1104. A longitudinal cross-sectional view taken along line A-A of FIG. 1 is shown in FIG. 12. A direct acting solenoid actuator (motor) 1200 sans valve nozzle body may be used for driving a spool (not shown), a three-way poppet valve (not shown), or other fluid control valve in relation to a commanded variable control pressure.

The actuator 1200 of FIG. 12 is similar to that shown in FIG. 10, with like numbers 00-24 corresponding to like elements. For example, the armature 1016 in FIG. 10 is labeled 1216 in FIG. 12. A first fully floating cage 1220 of radial bearings 1222 is disposed in the inner bore of the pole piece 1214, with the radial bearings 1222 riding on the inner surface of the pole piece 1214 and also riding on an outer surface of the push pin 1218 associated with the armature 1216. The outer end surface of the armature 1216 is also received in a second fully floating cage 1226 of radial bearings 1228 residing in the armature end cap 1204, which is fixed to the housing 1206 with the radial bearings 1228 riding on the outer end surface of the armature 1216. The second cage 1226 is fully floating as described above in the annular space between the end of the housing 1206 and the armature end cap 1204. This actuator 1200 would be supplied to a customer for integrating into the customer's valve or nozzle body for a particular fluid control valve.

The normally low and normally high pressure states of the control valve shown in FIG. 12 are established by externally commanded control current signals provided to the wire coil 1202.

Figure 13:
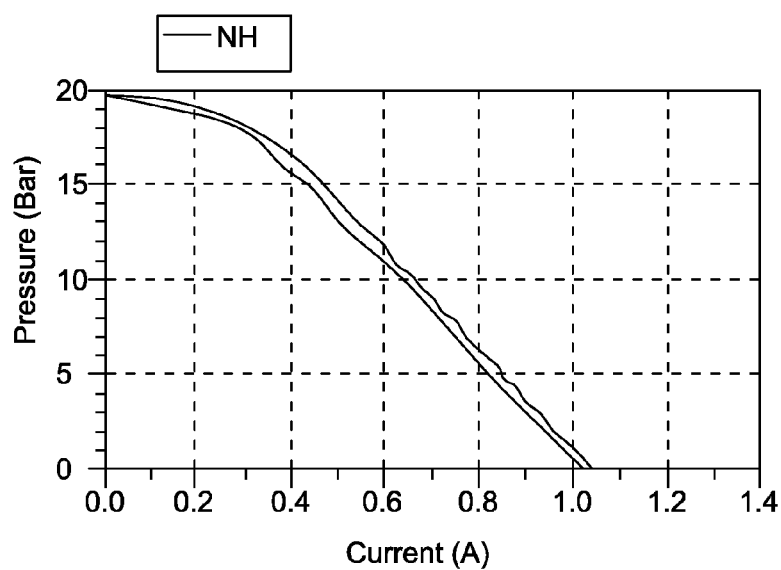
FIG. 13 shows normally high pressure versus current achievable by the fluid control valve of FIGS. 1, 2; 3, 4; and 5, 6.

FIG. 13 shows a hysteresis plot achievable by a normally high pressure at zero (0) coil current fluid control valve in FIGS. 1 and 2, described above. The two curves represent two current sweeps, in one case increasing current from 0 Amps to about 1 Amp (current in Amps on the horizontal axis), and in the other case decreasing current from about 1 Amp to 0 Amps. The minimal difference in pressure for a given current reflects the device's reduced friction and robustness to contaminants.

Figure 14:
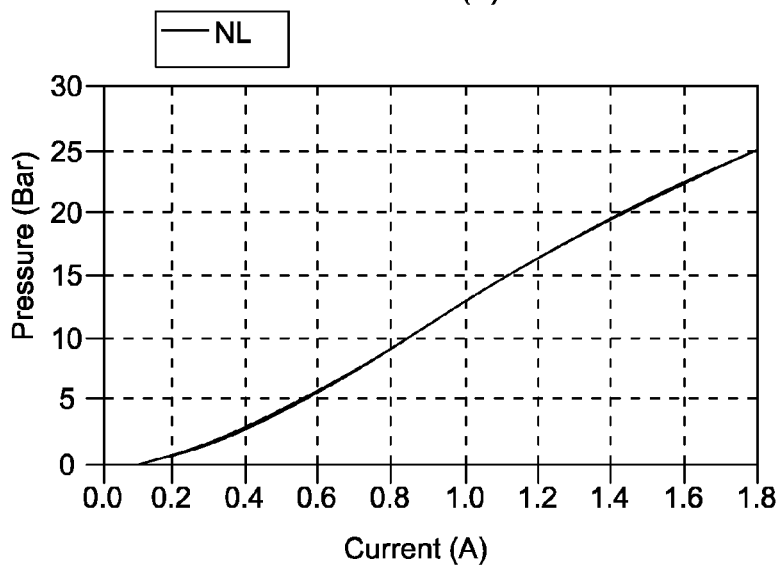
FIG. 14 shows normal low pressure versus current for the fluid control valve of FIGS. 7, 8; 3, 4; and 5, 6.

FIG. 14 shows a hysteresis plot achievable by a normally low pressure at zero (0) coil current fluid control valve such as the valve in FIGS. 7 and 8, described above. Like the previous plot, this plot reflects two current sweeps, one in which current in increasing, and one in which it is decreasing. In this case the hysteresis is sufficiently minimized that the two curves are indistinguishable.

Figure 15:
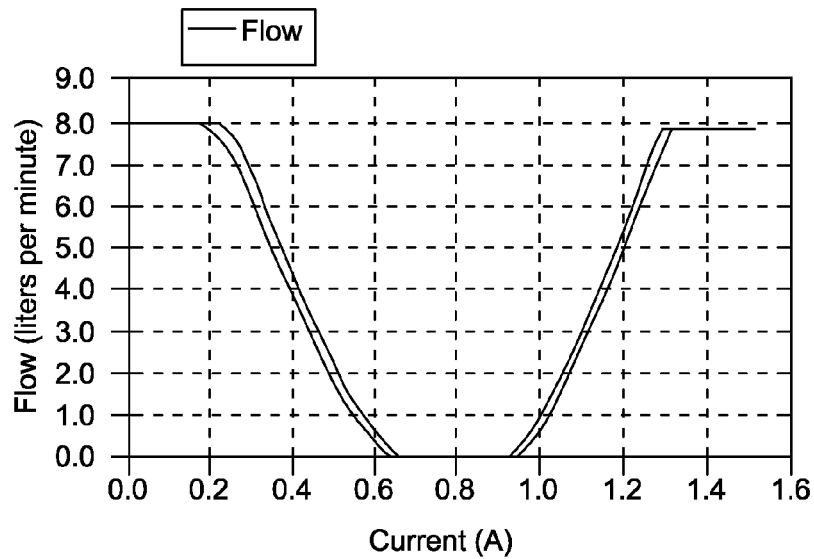
FIG. 15 shows flow versus current for the four-way fluid control valve of FIGS. 9, 10; 3, 4; and 5, 6.

FIG. 15 shows flow versus current for a four-way fluid control valve similar to that shown in FIGS. 9 and 10. As the current is increased from 0 Amps to about 0.8 Amps, the flow at one control port drops from 8 liters/minute to 0 liters/minute. As the current continues to increase from 0.8 Amps to 1.4 Amps, the flow at the other control port increases from 0 liters/min to 8 liters/min. The process then is reversed, creating the curves displayed in FIG. 15.

Although certain illustrative and/or preferred embodiments of the direct acting solenoid actuator and associated fluid control valves have been shown and described in detail, it should be understood that variations or modifications may be made without departing from the spirit or scope of the present invention.

What is claimed is:

1. A solenoid actuator comprising:
   a movable armature member;
   a fixed solenoid component having:
      a housing;
      a coil within said housing; and
      a pole piece for receiving said movable armature member; and,
   a cage of rolling elements disposed between the movable armature member and the fixed solenoid component;
   wherein the cage of rolling elements comprises a top portion and a bottom portion, and wherein the rolling elements are confined between the top portion and the bottom portion, the top portion including a semi-spherical top portion wall, the bottom portion including a semi-spherical bottom portion wall, each semi-spherical top and bottom portion wall partially encasing a bearing ball.

2. The solenoid actuator of claim 1 wherein the rolling elements comprise a plurality of radial bearings.

3. The solenoid actuator of claim 1 wherein the cage of rolling elements is confined to move within an annular space in the pole piece.

4. The solenoid actuator of claim 1 wherein the rolling elements ride on an inner surface of the pole piece and on an outer surface of the movable armature member.

5. The solenoid actuator of claim 1 wherein the movable armature member comprises a push pin coupled to an armature.

6. The solenoid actuator of claim 1 further including a spool coupled to the movable armature member.

7. The solenoid actuator of claim 1 wherein the top portion and the bottom portion comprise a ring having an inside and an outside, and wherein the rolling elements extend beyond the inside of the ring and the outside of the ring.

8. The solenoid actuator of claim 1 further comprising an armature end cap and a second cage of rolling elements between the armature end cap and the movable armature member.

9. The solenoid actuator of claim 8 wherein the rolling elements of the second cage of rolling elements ride on an inner surface of the armature end cap and on an outer surface of the movable armature member.

10. The solenoid actuator of claim 6 further comprising a second cage of rolling elements between the housing and the movable armature member.

11. The solenoid actuator of claim 10 wherein the rolling elements of the second cage of rolling elements ride on an inner surface of the housing and on an outer surface of the movable armature member.

12. The solenoid actuator of claim 10 wherein the second cage of rolling elements is confined to move within an annular space in the housing.

13. The solenoid actuator of claim 10 wherein the armature end cap limits the motion of the second cage of rolling elements.

14. A solenoid actuator fluid control valve comprising:
   a solenoid actuator component having:
      a movable armature member;
      a fixed solenoid component having:
         a housing;
         a coil within said housing; and
         a pole piece for receiving said movable armature member; and,
      a cage of rolling elements disposed between the movable armature member and the fixed solenoid component;
      wherein the cage of rolling elements comprises a top portion and a bottom portion, and wherein the rolling elements are confined between the top portion and the bottom portion, the top portion including a semi-spherical top portion wall, the bottom portion including a semi-spherical bottom portion wall, each semi-spherical top and bottom portion wall partially encasing a bearing ball; and a fluid control valve component having:
    a fixed nozzle body coupled to said housing; and
    a movable spool coupled to said movable armature member within the fixed nozzle body.

15. The solenoid actuator fluid control valve of claim 14 wherein the movable armature member engages the movable spool to regulate fluid pressure in the fixed nozzle body.

16. The solenoid actuator fluid control valve of claim 14 wherein the rolling elements comprise a plurality of radial bearings.

17. The solenoid actuator fluid control valve of claim 14 wherein the cage of rolling elements is confined to move within an annular space in the pole piece.

18. The solenoid actuator fluid control valve of claim 14 wherein the rolling elements ride on an inner surface of the pole piece and on an outer surface of the movable armature member.

\* \* \* \* \*